(12) United States Patent
Kamper et al.

(10) Patent No.: US 9,543,815 B2
(45) Date of Patent: Jan. 10, 2017

(54) SPLIT PERMANENT MAGNET MACHINE

(75) Inventors: Maarten Jan Kamper, Stellenbosch (ZA); Johannes Hendrik Jacob Potgieter, Stellenbosch (ZA); Johan Nico Stander, Stellenbosch (ZA)

(73) Assignee: Stellenbosch University, Stellenbosch, Western Cape Province (ZA)

( * ) Notice: Subject to any disclaimer, the term of this patent is extended or adjusted under 35 U.S.C. 154(b) by 314 days.

(21) Appl. No.: 13/814,081

(22) PCT Filed: Aug. 4, 2011

(86) PCT No.: PCT/IB2011/001812
§ 371 (c)(1),
(2), (4) Date: Apr. 22, 2013

(87) PCT Pub. No.: WO2012/017302
PCT Pub. Date: Feb. 9, 2012

(65) Prior Publication Data
US 2013/0214541 A1 Aug. 22, 2013

(30) Foreign Application Priority Data
Aug. 4, 2010 (ZA) ................... 2010/05553

(51) Int. Cl.
*H02K 21/12* (2006.01)
*H02K 16/02* (2006.01)
(Continued)

(52) U.S. Cl.
CPC ............. *H02K 21/12* (2013.01); *F03D 9/003* (2013.01); *H02K 7/1838* (2013.01); *H02K 16/02* (2013.01);
(Continued)

(58) Field of Classification Search
CPC ...... H02K 16/00; H02K 21/029; H02K 7/183; H02K 49/102; H02K 49/104; H02K 7/1838; H02K 21/12; H02K 21/22; H02K 17/16; F03D 9/002; F03D 9/003; Y02E 10/125; Y02E 10/725; F05B 2220/7068
(Continued)

(56) References Cited

U.S. PATENT DOCUMENTS 2,987,671 A * 6/1961 Williams ...................... 324/164
4,087,711 A * 5/1978 Kirtley et al. ................. 310/184
(Continued)

FOREIGN PATENT DOCUMENTS

| GB | WO 2009130456 A2 * | 10/2009 | ............... H02K 7/11 |
| WO | WO 2010/010762 | 1/2010 | |
| WO | WO 2010010762 A1 * | 1/2010 | |

OTHER PUBLICATIONS

Akutsu, Shigemitsu; Oya, Satoyoshi; Kasaoka, Kota; Abe, Noriyuki, Power Device (Engish Machine Translation), WO/2010/010762, Jan. 28, 2010.*
(Continued)

*Primary Examiner* — Terrance Kenerly
*Assistant Examiner* — Alexander Singh
(74) *Attorney, Agent, or Firm* — Merchant & Gould P.C.

(57) ABSTRACT

The invention relates to an electrical energy conversion system (11) which is particularly suited for use in wind energy conversion systems. The system includes two magnetically separated permanent magnet machines (25, 27) linked by a freely rotating rotor (19) housing permanent magnets (39). The first machine is typically a synchronous generator, and the second an induction generator. The synchronous generator (25) has a stationary stator (21) which is connectable to an electrical system such as an electricity grid, and the induction generator (27) has a rotor (17) which is connectable to a mechanical drive system such as, for example, a wind turbine.

10 Claims, 10 Drawing Sheets

(51) Int. Cl.
　　　*H02K 21/22*　　(2006.01)
　　　*H02K 29/03*　　(2006.01)
　　　*H02K 7/18*　　(2006.01)
　　　*F03D 9/00*　　(2016.01)
　　　*H02K 17/16*　　(2006.01)

(52) U.S. Cl.
　　　CPC .............. *H02K 17/16* (2013.01); *H02K 21/22* (2013.01); *H02K 29/03* (2013.01); *Y02E 10/725* (2013.01)

(58) Field of Classification Search
　　　USPC ................ 310/112, 113, 114, 115, 101, 171, 310/216.025, 216.029
　　　See application file for complete search history.

(56) References Cited

U.S. PATENT DOCUMENTS

| 5,709,103 | A | * | 1/1998 | Williams ........................ 62/402 |
| 6,906,447 | B2 | * | 6/2005 | Leijon ...................... H01F 3/10 174/DIG. 17 |
| 2007/0090707 | A1 | * | 4/2007 | Moriya et al. ................. 310/113 |
| 2009/0121482 | A1 | * | 5/2009 | Rickard ........................... 290/44 |
| 2009/0200884 | A1 | * | 8/2009 | Lafontaine et al. .......... 310/114 |
| 2011/0109180 | A1 | | 5/2011 | Akutsu et al. |

OTHER PUBLICATIONS

International Search Report for PCT/IB2011/001812 mailed Dec. 1, 2011 (2 pgs.).
International Preliminary Report on Patentability for PCT/IB2011/001812 mailed Dec. 20, 2012 (12 pgs.).
Written Opinion for PCT/IB2011/001812 mailed Aug. 2, 2012 (4 pgs.).

\* cited by examiner

DIMENSIONS AND PERFORMANCE OF PMIG AT 50 Hz and 150 r/min.

| Parameter | IG | SG |
|---|---|---|
| Outer diameter (mm) | 652 | 653.5 |
| Inner diameter (mm) | 483 | 494 |
| Magnet pitch / pole pitch | 0.84 | 0.73 |
| Air gap (mm) | 2 | 2 |
| Slot width (mm) [ = 1 pu ] | 17.5 | 18 |
| Magnet height (mm) | 8 | 6 |
| Yoke height (mm) | 10 | 10 |
| Magnet-yoke height (mm) | 11.5 | 7.25 |
| Axial length (mm) | 62.5 | 100 |
| Torque (Nm) | 1000 | 1000 |
| Efficiency (%) | 98.3 | 94.4 |
| Rated slip (%) | 1.76 | - |
| $L_d/L_q$ at rated load | 1.5 | 1.4 |

SPLIT PERMANENT MAGNET MACHINE

This application is a National Stage Application of PCT/IB2011/001812, filed 4 Aug. 2011, which claims benefit of Serial No. 2010/05553, filed 4 Aug. 2010 in South Africa and which application(s) are incorporated herein by reference. To the extent appropriate, a claim of priority is made to each of the above disclosed applications.

FIELD OF THE INVENTION

This invention relates to a permanent magnet excited machine and system. In particular, but not exclusively, the invention relates to a permanent magnet induction generator of the type typically used in wind generators.

BACKGROUND TO THE INVENTION

An induction generator (IG), as is commonly known in the art, is a type of electrical generator that is mechanically and electrically similar to a polyphase induction motor (IM). An IG produces electrical power when its shaft is rotated faster than the synchronous frequency of the equivalent IM. IGs are often used in energy conversion systems or wind turbines and some micro hydro installations due to their ability to produce useful power at marginally varying rotor speeds. IGs are also generally mechanically and electrically simpler than other generator types. They are also more rugged and require no brushes or commutators.

IGs are, however, not self-exciting, meaning they require an external electrical supply to produce a rotating magnetic flux. The external supply can be supplied from an electrical grid or from the generator itself, once it starts producing power. The rotating magnetic flux from the stator induces currents in the rotor, which in turn also produces a magnetic field. If the rotor turns slower than the rate of the rotating flux, the machine acts like an induction motor. If the rotor is turned faster, it acts like a generator, producing power at the synchronous frequency.

In most IGs the magnetising flux is established by a capacitor bank connected to the machine in case of stand-alone systems. In the case of grid connected systems it draws magnetising current from the grid. IGs are suitable for wind energy conversion systems as speed is always a variable factor in these applications.

The concept of having an internally excited permanent magnet induction generator (PMIG) is known. These generators function on the principle of having an additional, freely rotating permanent magnet (PM) rotor in combination with the normal induction rotor, generally positioned between the induction rotor and the stator. The PM rotor provides the flux within the machine, thus alleviating the need for a magnetizing current which, in turn, results in an improved power factor for the machine as a whole.

Most commercially available wind energy conversion systems currently utilise a combination of complex gearboxes and high speed IMs. These systems are generally directly connected to an electricity grid, which is made possible by the IM being capable of slipping, thus allowing for a soft grid connection.

Figure 1:
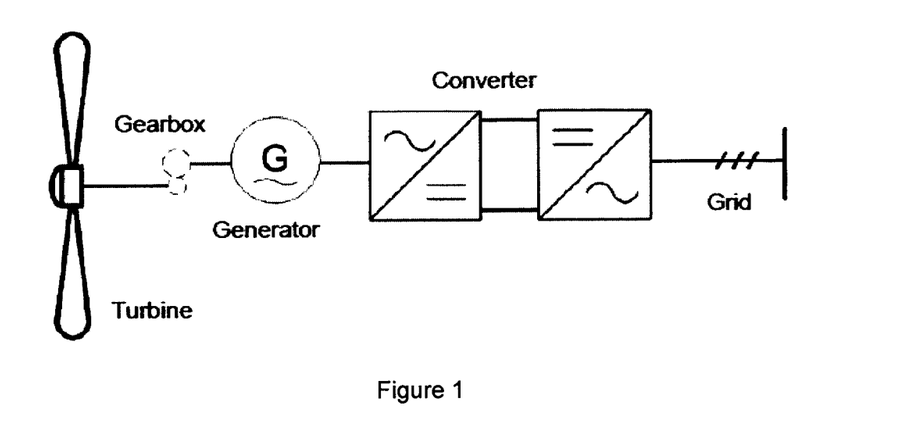
FIG. 1 is an electrical layout of a common wind turbine drive train.

A popular alternative in wind energy conversion system layout and design is the low speed permanent magnet synchronous machine (PMSM). The layout of a typical drive train is shown in FIG. 1. The drive train can represent either an induction machine or a synchronous machine. If, for example, the gearbox is omitted the drive train can represent a PMSM and if the converter is omitted it can represent an induction machine. The PMSM may also rely on a full frequency electronic power converter to change the voltage level and the frequency of the generated power, so as to allow it to connect directly into the electricity grid. In what follows, the term power converter will refer to a full frequency electronic power converter. A system, such as the one shown, which does not utilise a gearbox is known as a direct drive system.

More variations like the doubly fed induction generator (DFIG) which is used regularly in the wind turbine industry, combinations of PMSMs and gearboxes, or IMs and converters are used on a limited scale (i.e. mostly utility scale) in some markets. To the applicant's knowledge, wind turbine systems currently in use generally consist of the electrical machine which is operated in conjunction with a gearbox, a power converter or both.

Because most conventional wind turbines generally operate at low rotational speeds, gearboxes are needed in order to use them with high speed IMs. Without a converter of sorts, IMs can only operate as high speed devices due to the large increase in the magnetizing current for low speed, directly grid connected induction machines. PMSMs on the other hand can operate efficiently at low rotational speeds but cannot be directly connected to an electricity grid in a wind energy conversion system.

Gearboxes and power converters used in conventional wind energy conversion systems are mechanically complex, expensive, maintenance intensive pieces of equipment, which increase the overall cost of the overall system. Gearboxes also contribute substantially to the overall system mass and losses due to, for example, heat and noise. Power converters, on the other hand, are complex and expensive, electrically sensitive systems.

Figure 2:
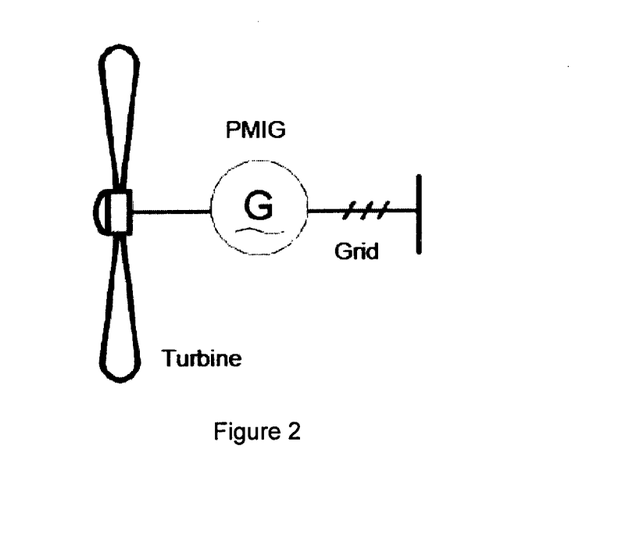
FIG. 2 is an electrical layout of a typical permanent magnet induction generator (PMIG)
Figure 3:
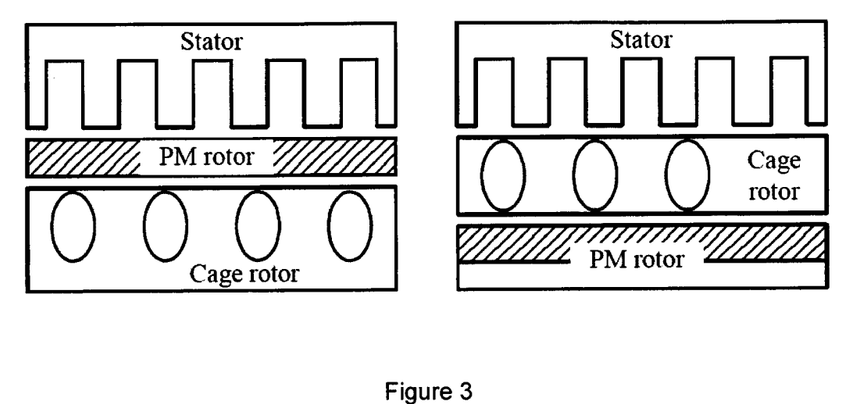
FIG. 3 is a cross section of a conventionally coupled permanent magnet induction generator.
Figure 4:
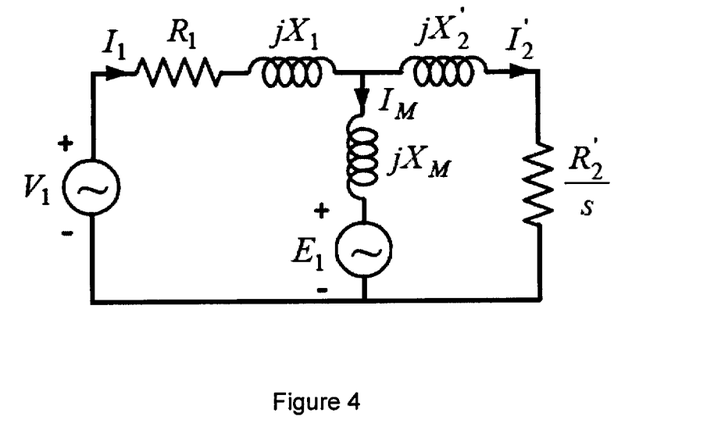
FIG. 4 is an equivalent electrical circuit layout of the permanent magnet induction generator of FIG. 3.

The layout of a typical PMIG is shown in FIG. 2. The PMIG consists of an ordinary stator, an induction type cage rotor and an additional, free rotating PM rotor between the stator and rotor of an induction machine or in the inside of the rotor (or outside of the stator), as is more clearly shown in FIG. 3. When used in a wind turbine, the mechanical shaft power which is supplied by the wind turbine rotor to the electrical machine is transmitted to the cage induction rotor, while the PM rotor rotates freely and independently on its own shaft. The PM rotor supplies the magnetic flux within the electrical machine and induces a voltage in the stator winding as shown in the equivalent electrical circuit layout of FIG. 4. This, in principle, reduces the magnetizing current and improves the power factor of the machine. These generators typically make use of standard stator and cage rotor windings. It has, however, been found that there is a cogging (torque) effect between the PM rotor and the stator or rotor. Cogging causes the PM rotor to lock with respect to the stator core or cage-rotor core, which causes instability at low slip speeds.

The advantages of PMIGs for wind, as well as other, generator applications are very attractive as it avoids the use of gearboxes and the use of power converters for grid-connection. The device is therefore a direct-drive direct-grid wind energy converter which is a very attractive concept. But in spite of these obvious advantages, to the applicant's knowledge, no PMIG wind generator has as yet been installed or tested. The main reasons for this appear to be the difficult construction of the machines.

OBJECT OF THE INVENTION

It is an object of this invention to provide a permanent magnet induction generator which will, at least partially, alleviate some of the difficulties mentioned above.

SUMMARY OF THE INVENTION

In accordance with this invention there is provided an electrical energy conversion system comprising two permanent magnet machines linked by a freely rotating rotor housing permanent magnets, a first of the two permanent magnet machines having a stationary stator which is connectable to an electrical system, and a second of the two permanent magnet machines having a rotor which is connectable to a mechanical system, the system being characterized in that the two permanent magnet machines are magnetically separated from one another.

Further features of the invention provide for the permanent magnet machines to be generators, preferably for the first permanent magnet machine to be synchronous generator and for the second permanent magnet machine to be an induction generator and for the rotor of the induction generator to be cage-type rotor.

Still further features of the invention provide for the freely rotating rotor to include at least two rotor portions, each rotor portion carrying a series of permanent magnets spaced apart around its periphery and for it to be of modular construction with the rotor portions removably securable to one another, thereby allowing the permanent magnet machines to be operated in combination when the rotor portions are secured to one another and separately when the rotor portions are detached from one another.

Yet further features of the invention provide for the permanent magnet machines to be mounted end to end in co-axial alignment about a common shaft when working in combination; for the freely rotating permanent magnet rotor to rotate synchronously with the induction generator rotor; and for the induction generator (27) to run at slip speed with respect to the synchronously rotating permanent magnet rotor.

Further features of the invention provide for the two series of permanent magnets to be mechanically linked so as to rotate together; for the series of permanent magnets on a first rotor portion to be configured to excite coils on the stationary stator of the synchronous generator; and for the series of permanent magnets on a second rotor portion to be configured to excite coils on the rotor of the induction generator. The first rotor portion may be removably securable to the second rotor portion in co-axial alignment.

Still further features of the invention provide for the rotor of the induction generator to be an induction type cage rotor having non-overlap rotor bar windings; for the induction type cage rotor to have concentrated windings and double layer windings; for the system to be incorporated in a wind turbine with rotor blades of the wind turbine secured to the rotor of the induction generator; and for the system to be a direct drive, directly grid connected system.

The invention also provides an electrical energy conversion system comprising two rotors and a stator with a first of the two rotors being an induction type cage rotor and a second of the two rotors being a freely rotating permanent magnet rotor, the freely rotating permanent magnet rotor including two co-axially aligned, magnetically separated rotor portions, each rotor portion having a series of permanent magnets spaced apart about its periphery, the rotor portions being positioned to allow the series of magnets on a first rotor portion to excite coils on the stator and the series of magnets on the second rotor portion to excite coils on the induction type cage rotor; as well as for a wind turbine incorporating an electrical energy conversion system as described in this specification.

DETAILED DESCRIPTION WITH REFERENCE TO THE DRAWINGS

Figure 5:
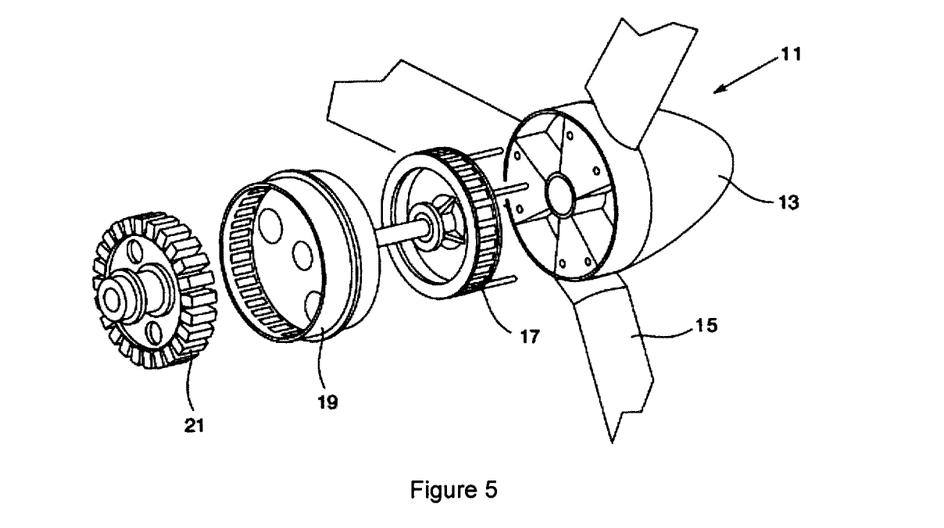
FIG. 5 is a split permanent magnet induction generator in accordance with the invention.
Figure 6:
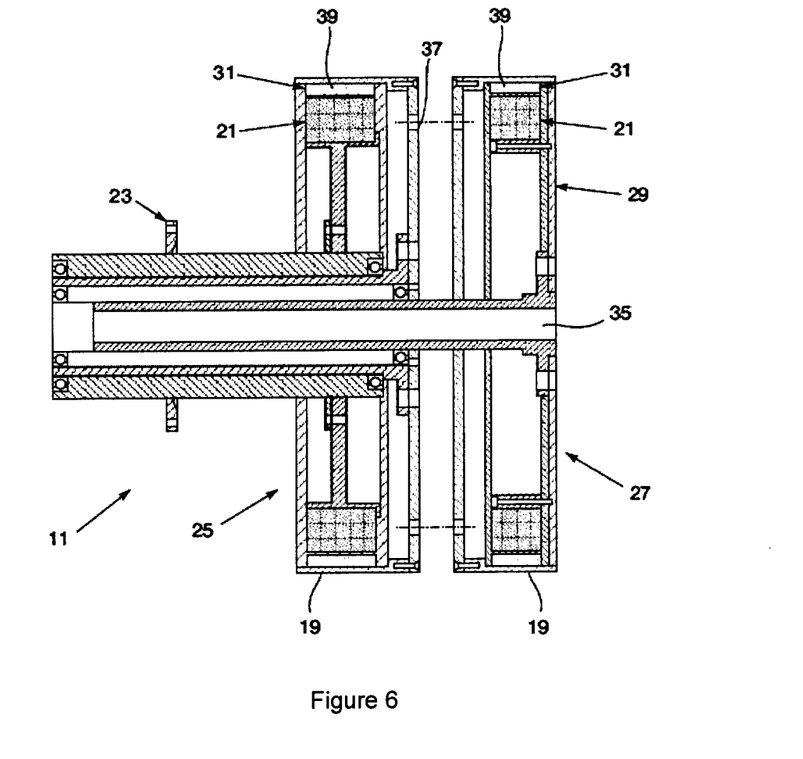
FIG. 6 is a cross section of a split permanent magnet induction generator in accordance with the invention.

An electrical energy conversion system (11), in the current example also referred to as a Split Permanent Magnet Induction Generator ("S PMIG"), as shown in FIGS. 5 and 6, generally comprises a wind turbine (13) including a set of rotor blades (15), an induction-type cage rotor (17), a common permanent magnet (PM) rotor (19) and a grid connected stator (21).

The S-PMIG (11) is electro-magnetically split into two PM generators (25 and 27), linked by the freely rotating, modular PM rotor (19). The first generator (25) is a synchronous generator (SG) with its stationary stator (21) electrically connected to the electricity grid. The second generator (27) operates as an induction generator (IG) and has its short-circuited rotor (17) mechanically connected to the turbine (13), which runs at slip speed with respect to the synchronously rotating PM rotor (19). The IG rotor (17) is connected to the turbine (13) by means of a mounting plate (29).

The PM rotor (19) comprises two co-axially secured rotor shells (31 and 33), each having a series of permanent magnets (39) spaced apart around its periphery on its inner surface. The first rotor shell (31) operates with the SG (25) and the second (33) with the IG (27). The IG's (27) PM-rotor (33) is mounted onto the SG's (25) PM-rotor (31), while the IG's (27) non-overlap rotor bar winding and shaft (35) are mounted onto the mounting plate (29); in the case of a single layer non-overlap rotor bar winding, the short-circuited single turn rotor bar coils can be manufactured separately and then inserted into the rotor slots. It should be appreciated that the mounting plate (29) can also act as a short-circuit conductor for the rotor (17).

Figure 9:
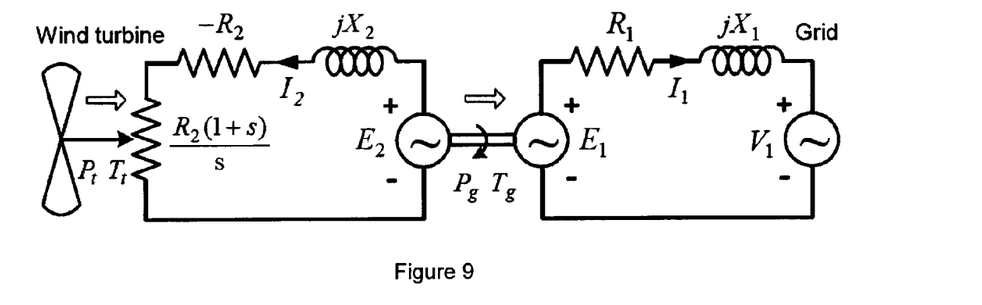
FIG. 9 is an equivalent electrical circuit of the split permanent magnet induction generator of FIGS. 5 and 6.

The magnetically split PMIG can thus be modelled as two separate, decoupled machines (as is also clear from the per phase equivalent circuit shown in FIG. 9). The per phase induced voltages in both machines result from the rotating PM rotor (19); in the case of the SG (25), a voltage is induced in the stator (21) at grid frequency and in the case of the IG (27) a voltage is induced in the induction rotor (17) at slip frequency. During operation, rotational power of the turbine (13) is mechanically transferred to the induction rotor (17) and magnetically transferred to the PM rotor (19) from where it is again magnetically transferred to the SG stator (21) and then to the grid.

Non-overlap windings are used for both the SG (25) and IG (27). It should be appreciated that this creates a huge advantage in terms of reduced cogging effects and load torque ripple. Furthermore, the number of coils is less. Low cogging torque is vital as it affects, amongst other things, the stability of the freely rotating PM rotor (19), in particular at low slip speeds.

It should immediately be apparent that the IG (27) can be completely removed, and the wind turbine (13) mounted directly onto the SG's mounting plate (37). The generator (11) will then simply be a normal direct drive PM wind generator.

It should be noted that the axial length of the IG-rotor (17) is shorter than that of the SG stator (21), with both at the same power rating; this is the result of the design optimisation discussed further below.

Both the design optimisation and the performance evaluation of the S-PMIG that follows below are done with the machine in the steady state and in the dq reference frame fixed to the rotor. The steady state dq equations of the IG (27) and SG (25) are given by equations (1) and (2) respectively (positive current is taken as flowing out) as $$0 = -I_{qr}R_r - \omega_{sl}L_{dr}I_{dr} + \omega_{sl}\lambda_{mr}$$

$$0 = -I_{dr}R_r + \omega_{sl}L_{qr}I_{qr} \quad (1);$$

$$V_{qs} = -I_{qs}R_s - \omega_s L_{ds}I_{ds} + \omega_s \lambda_{ms}$$

$$V_{ds} = -I_{ds}R_s + \omega_s L_{qs}I_{qs}, \quad (2)$$

where $\omega_{sl}$, is the electrical slip speed equal to $\omega_{sl} = \omega_r - \omega_s$ and $\omega_t$ is the turbine speed and $\omega_s = 2\pi f$ is the synchronous speed, and where subscript "r" donates the IG-rotor (27) and "s" donates the SG-stator (21).

Figure 7:
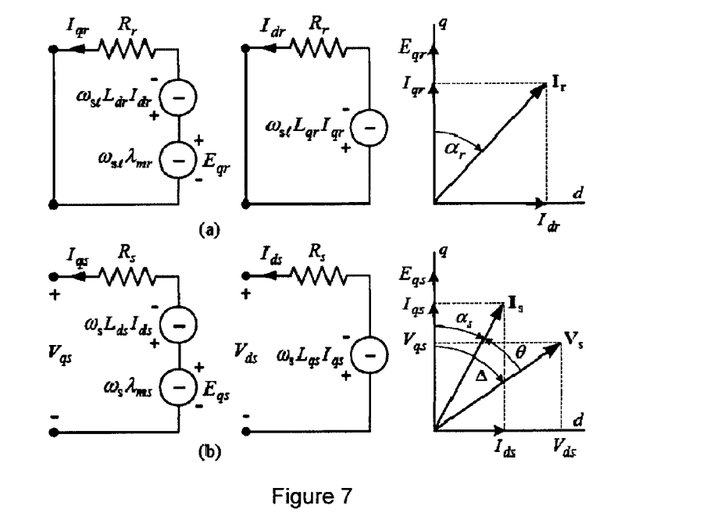
FIG. 7 shows steady-state dq equivalent circuits and vector diagrams of (a) the IG and (b) the SG.

The load angle $\Delta$, the current angle $\alpha$ and the SG's power factor angle $\theta = \Delta - \alpha_s$ are all defined in the vector diagrams of FIG. 7. The general relations of voltage, current and copper losses are given by equations (3)-(6) as $$\begin{bmatrix} V_{qs} \\ V_{ds} \end{bmatrix} = \sqrt{2}\,V_{rms}\begin{bmatrix} \cos\Delta \\ \sin\Delta \end{bmatrix}; \quad (3)$$

$$\begin{bmatrix} I_q \\ I_d \end{bmatrix} = \sqrt{2}\,I_{rms}\begin{bmatrix} \cos\alpha \\ \sin\alpha \end{bmatrix}.$$

$$V_{qs}^2 + V_{ds}^2 = 2V_{rms}^2 \quad [V_{rms} = V_{grid}]; \quad (4)$$

$$I_q^2 + I_d^2 = 2I_{rms}^2 \quad (5)$$

and $$I_{rms}^2 = \frac{P_{cu}}{3R}. \quad (6)$$

Pcu in equation (6) is the copper loss of the rotor or stator winding. The developed torque of both the IG and SG is given by $$T_g = \frac{3}{4}p[(L_q - L_d)I_d I_q + \lambda_m I_q], \quad (7)$$

where the dq inductances are defined as $$L_q = \frac{\lambda_q}{-I_q}; \quad L_d = \frac{\lambda_d - \lambda_m}{-I_d}. \quad (8)$$

The efficiency of the PMIG is given by $$\eta = \eta_{IG}\eta_{SG}, \quad (9)$$

where $$\eta_{IG} = \frac{P_{gr}}{P_t} = \frac{T_{gr}\omega_{sm}}{T_{gr}\omega_{tm}} \quad (10)$$

and $$\eta_{SG} = \frac{P_{gs}}{P_{gr}} = \frac{T_{gr}\omega_{sm} - (P_{ecs} + P_{wfs}) - P_{cus}}{T_{gr}\omega_{sm}} \quad (11)$$

and where subscript "m" donates mechanical speed. In equation (11), $P_{wfs}$ and $P_{ecs}$ are respectively the wind-and-friction and the eddy- current-and-core losses of the SG. Note that $P_{wfr}$ and $P_{ecr}$ of the IG are practically zero, thus from equation (10) the only remaining (copper) losses are given by $P_{cur} = T_{gr}\omega_{slm}$. The torque of the SG is also given from equation (11) by $$T_{gs} = T_{gr} - \frac{(P_{ecs} + P_{wfs})}{\omega_{sm}}. \quad (12)$$

$P_{ecs}$ in equations (11) and (12) includes the eddy current losses in the magnets and PM yoke of the SG, which can be substantial when using solid magnets and solid rotor yokes.

With the generator operating at a constant speed, $P_{wfs}$ is considered as constant in the modelling and is calculated once. The stator core losses of the SG are calculated by means of an empirical formula using, amongst other things, the air gap flux density data from FE analysis. The SG's eddy current losses in the magnets and PM yoke are also determined once (after the design optimisation) from FE transient loss calculations. Finally, the SG's working power and reactive power supplying to or consuming from the grid are given by $$\begin{bmatrix} P_{gs} \\ Q_{gs} \end{bmatrix} = 3V_{rms}I_{rms}\begin{bmatrix} \cos\theta \\ \sin\theta^* \end{bmatrix}. \quad (13)$$

Figure 8:
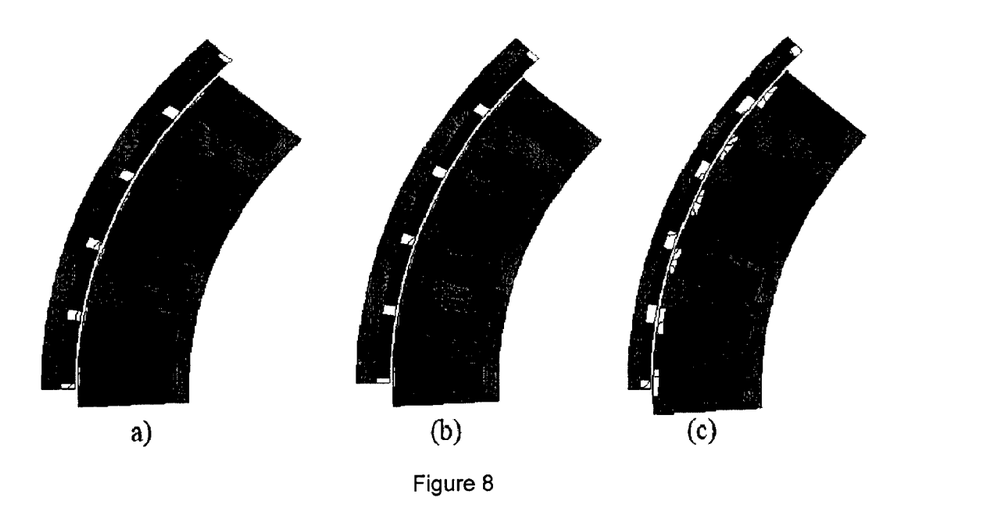
FIG. 8 are cross sections and FE plots of (a) double layer IG, (b) single layer IG and (c) single layer SG.

The cross-sections and FE modelling of the non-overlap winding PMIG and PMSG are shown in FIG. 8. As the grid frequency is 50 Hz and the rated turbine speed is 150 r/min, the number of poles for the SG is p=40; the same number of poles is also used for the IG in this case. With p=40 and choosing the high winding factor 10-12 pole-slot combination, five poles and six slots form a machine section in the FE model using negative periodic boundary conditions. For both the IG and SG surface-mounted PMs are used. For the IG, both single and double layer rotor bar windings have been investigated, but for the SG only a single layer winding with preformed coils is considered. In the case of the IG, solid rotor yokes are used as the eddy current frequencies are very low. In the case of the SG both laminated and solid partial-segmented rotor yokes are considered.

The optimum design of only the PM rotor and rotor winding of the IG shown in FIGS. 8 (*a*) and (*b*) are considered here. The design optimisation of a 15 kW IG was done subject to the required performance of the machine given by $U_{IG}$ and $G_{IG}$ as $$U_{IG} = \begin{bmatrix} P_{gr} \\ \omega_{sm} \\ \eta_{IG} \end{bmatrix}$$

$$= \begin{bmatrix} 15.96 \text{ kW} \\ 15.71 \text{ rad/s} \\ 98.3\% \end{bmatrix} \Rightarrow G_{IG}$$

$$= \begin{bmatrix} T_{gr} \\ P_{cur} \\ \omega_{sfm} \end{bmatrix}$$

$$= \begin{bmatrix} 1016 \text{ Nm} \\ 276 \text{ W} \\ 0.27 \text{ rad/s} \end{bmatrix}$$

(14)

where $P_{gr}$=15 kW/$\eta_{SG}$ with $\eta$SG=94% given, and where the synchronous speed is 150 r/min. The IG's efficiency was taken very high in equation (15) to ensure an overall efficiency of $\eta$>92%. Note from equation (14) that the rated slip is 1.73%, and that a lower required efficiency will increase the rated slip.

The design optimisation of the IG was done by maximising the torque per copper losses of the machine. Maximising the torque per copper losses at a fixed speed is the same as maximising the efficiency of the IG as the core losses of the IG are practically zero. The objective function to be maximised in the optimisation, thus, is given by $$F(X) = \frac{T_{gr}}{P_{cur}}(X), \quad (15)$$

where X is a dimensional vector that includes all the dimensions of the machine to be optimised. These dimensions include the magnet pitch, slot pitch (in the case of the single layer winding), slot opening, slot width, yoke heights, magnet height and air gap diameter of the IG. The outer and inner stack diameters are the same as that of the SG and are kept constant in the optimisation. After the design optimisation the axial stack length of the IG is adjusted so as to obtain the required performance of equation (14) at rated copper losses. At this new axial length a next design optimisation is executed to confirm the optimum design.

The design optimisation is done by means of an optimisation algorithm (Powell's algorithm) that is integrated with the FE program. With each iteration, the optimisation algorithm calls the FE-program to calculate the function value of equation (15) for a given X. The FE-program then re-meshes the machine structure according to X and calculates the function value by means of a number of non-linear static FE solutions. This is done as follows:

(i) $I_{rms}$ is calculated from equation (6), at the rated copper losses of equation (14) and with $R_r$ calculated analytically according to the given slot dimensions.

(ii) With $I_{rms}$ known and $\alpha_r$=0, $\lambda_{mr}$ is first calculated from one FE solution, i.e. by transforming the FE-calculated phase flux linkages to dq parameters using Park's transformation. In this way the effect of the q-axis current, $I_{qr}$, on $\lambda_{mr}$ is taken into account.

(iii) With $I_{rms}$ known, and at a relatively small, chosen current angle $\alpha_r$, initial values for $I_{dr}$ and $I_{qr}$ are calculated.

(iv) With currents and current angle known, a FE solution is used to calculate $\lambda_{dr}$ and $\lambda_{qr}$, and, hence, $L_{dr}$ and $L_{qr}$ according to equation (8).

(v) With $\lambda_{mr}$, $I_{rms}$ and initial values for $L_{dr}$ and $L_{qr}$ known, new values for $I_{dr}$ and $I_{qr}$ and the slip speed $\omega_{sl}$ are calculated by solving simultaneously from equations (1) and (5).

(vi) With new $I_{dr}$, $I_{qr}$ currents and a new current angle $\alpha_r$, steps (iv) and (v) are repeated for higher accuracy in the calculation of the dq currents; if found necessary another iteration can be executed.

(vii) With currents and inductances known, $T_{gr}$ of equation (7) and F(X) of equation (15) are finally calculated and returned to the optimisation algorithm. A total number, thus, of say three to four static FE solutions are used to calculate the function value.

Figure 10:
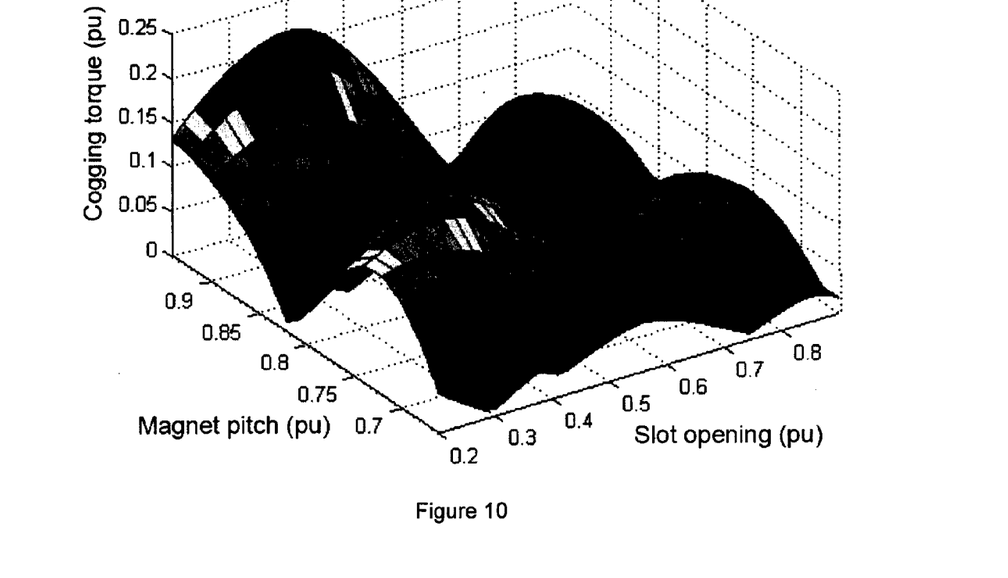
FIG. 10 is a three-dimensional graph showing the sensitivity of the cogging torque to magnet pitch and slot opening variations in an induction generator in accordance with the invention.
Figure 11:
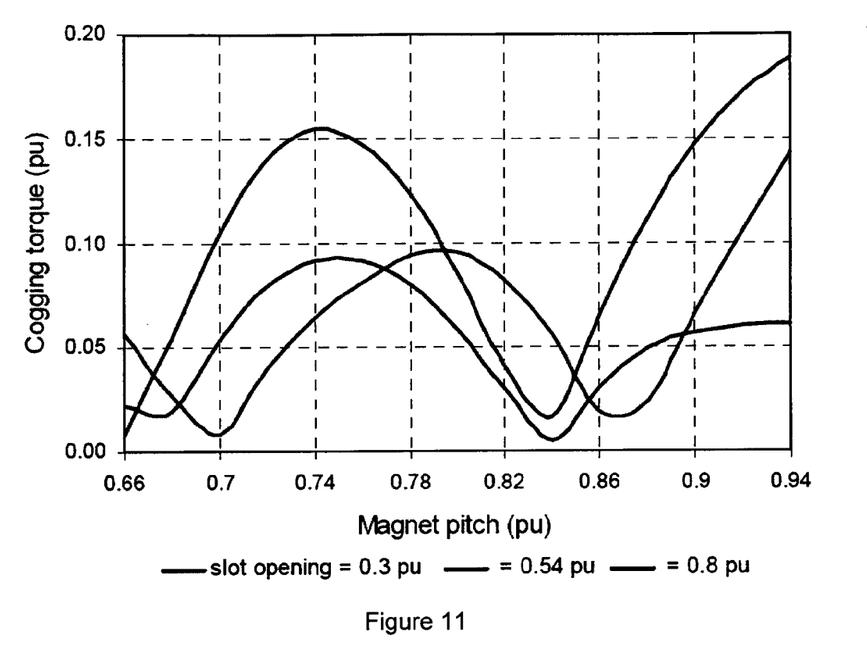
FIG. 11 is a two-dimensional graph showing the cogging torque and magnet pitch in the graph of FIG. 10.
Figure 12:
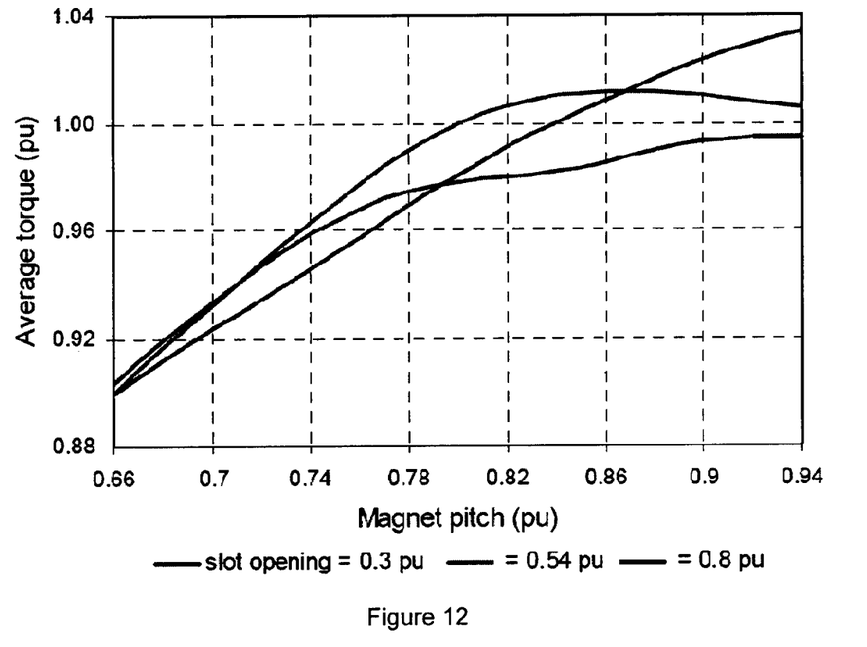
FIG. 12 is a graph showing the average torque against magnet pitch variation in a system according to the invention.

After completion of the optimum design as described above, the cogging torque of the IG was next minimised by further adjustments of the magnet pitch and the slot opening of the IG; these dimensions have the largest effect on the cogging torque. A sensitivity analysis procedure was followed to determine the sensitivity of the cogging torque to magnet pitch and slot opening variations. These results are shown in FIG. 10 and are obtained from a high number of static FE solutions. It is clear from FIG. 10 and FIG. 11 that there are regions where the cogging torque is fairly independent of dimensional change and where the cogging torque is very low (less than 1%). Also shown in FIG. 12 is the relatively low sensitivity of the generated torque to magnet pitch variation, fairly independent of slot opening.

Figure 13:
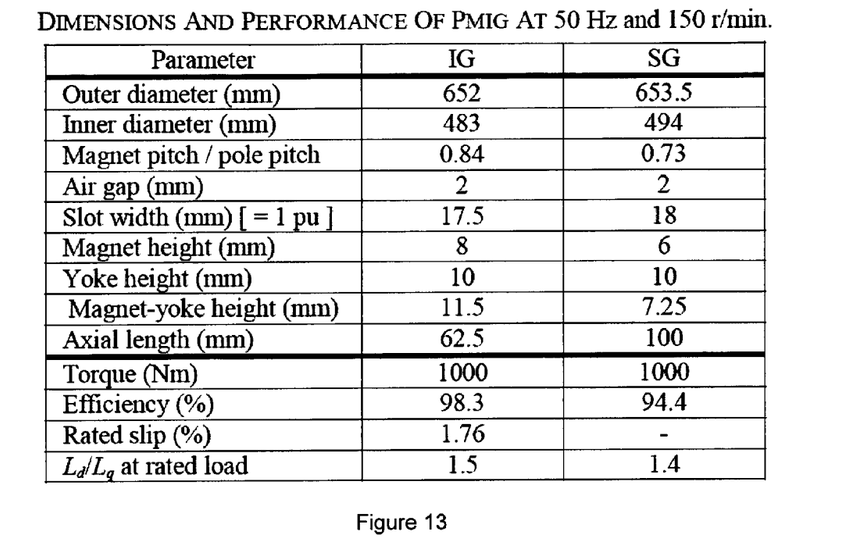
FIG. 13 is a table showing machine dimensions arrived at by means of design optimisation and cogging torque minimisation.

The final machine dimensions found from the design optimisation and the cogging torque minimisation are given in the Table shown in FIG. 13; the optimum cross section layouts of the IG are shown in FIGS. 8(*a*) and (*b*). Also given in the table in FIG. 13 is the rated performance of the IG. At the relatively high efficiency of 98.3% the active mass of the optimum designed IG is 70% that of the optimum designed SG, mainly due to the much better filling factor using rotor bars.

As the PMIG wind generator system is an uncontrolled system, the currents of equations (1) and (2) have to be solved in order to simulate the steady state performance of the PMIG versus load, i.e. versus slip speed.

For quick simulation results the dq inductances of both the IG and SG were first determined as functions of current. This was done by calculating $\lambda_m$ at no-load and dq flux linkages at load from static FE solutions, and then using equation (8). The dq inductances calculated in this way of, for example, the IG, are shown in FIG. 13. This shows the drastic effect of saturation and cross-magnetisation on the dq inductances of (even) a surface mounted PM machine.

For the simulation of the IG's performance versus load the slip frequency $\omega_{sl}=\omega_r-\omega_s$ of (1) is taken as a given input parameter. $I_{dr}$ and $I_{qr}$ are then determined by solving equation (1) simultaneously, using initial values for $L_{dr}$ and $L_{qr}$ obtained from FIG. 14. With new values for $I_{dr}$ and $I_{qr}$, $L_{dr}$ and $L_{qr}$ are updated in a second iteration from FIG. 14, followed by calculating $I_{dr}$ and $I_{qr}$ by solving equation (1) again. For higher accuracy further iterations may be followed. With $I_{dr}$ and $I_{qr}$ and $L_{dr}$ and $L_{qr}$ known, the torque and the efficiency of the IG for the given slip speed can be determined from equations (7) and (10).

In exactly the same way as the IG the SG's dq currents $I_{ds}$ and $I_{qs}$ are determined by solving equation (2) simultaneously. In this case $V_{rms}$ and $\omega_s$ are known, and $\Delta$ is the variable input parameter; $V_{ds}$ and $V_{qs}$ are, thus, known from equation (3). At each slip speed and calculated IG's torque, $\Delta$ is increased iteratively to increase the SG's torque until the required torque of equation (12) is obtained. At this $\Delta$ the power and reactive power of the SG are calculated from equation (13).

Figure 14:
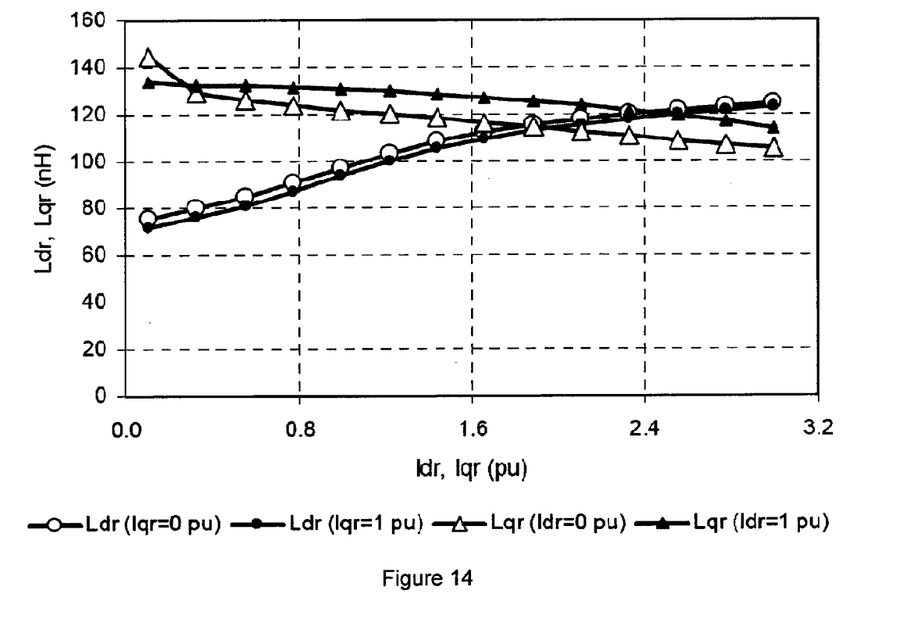
FIG. 14 is a graph showing dq inductances against dq current of an IG according to the invention.
Figure 15:
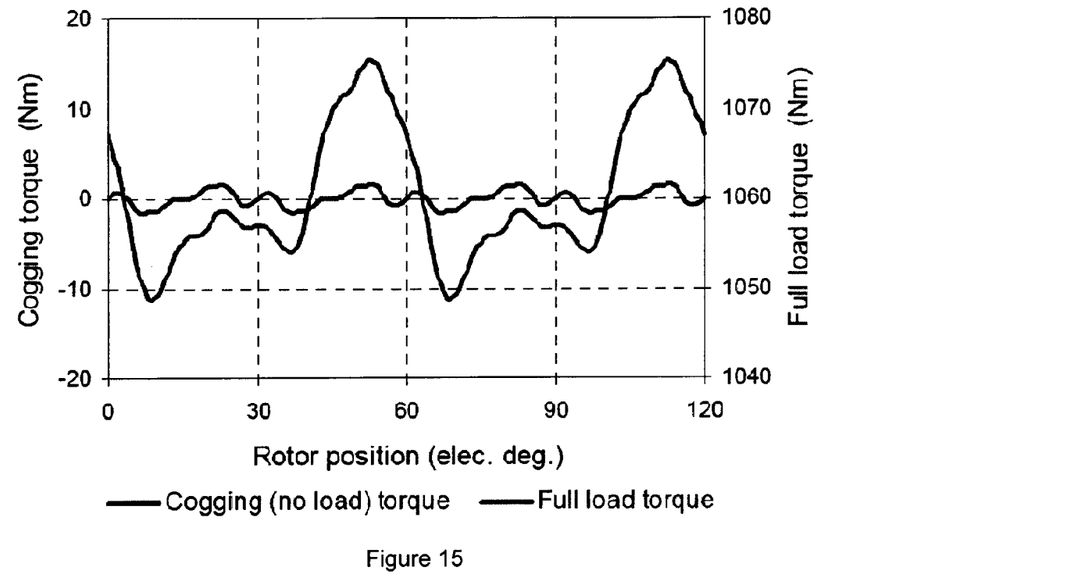
FIG. 15 is a graph showing cogging torque and full load torque ripple against rotor position in a machine according to the invention.
Figure 16:
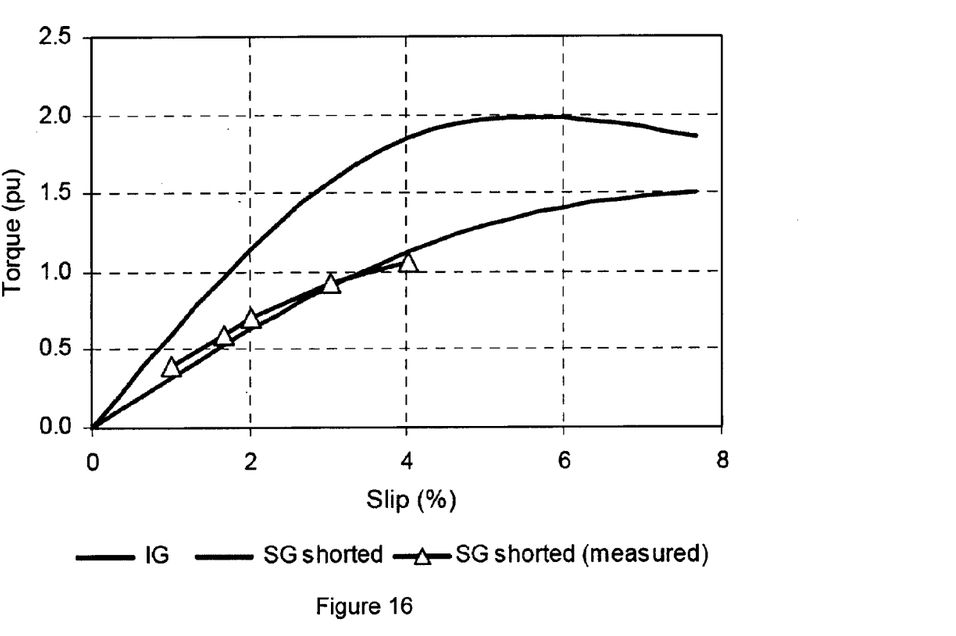
FIG. 16 is a graph showing torque against percentage slip in a machine according to the invention.
Figure 17:
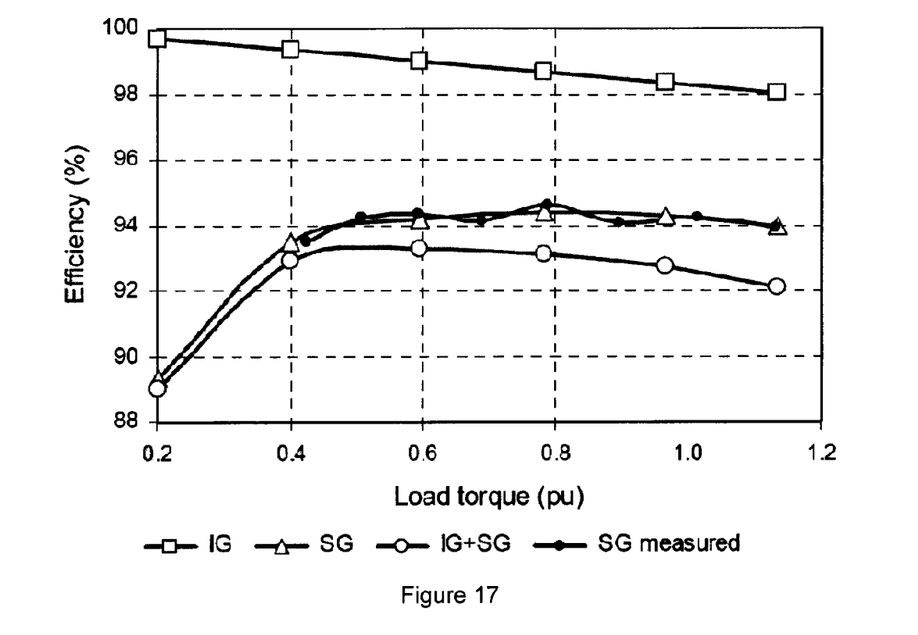
FIG. 17 is a graph showing the percentage efficiency of a machine according to the invention for a range of load torques.
Figure 18:
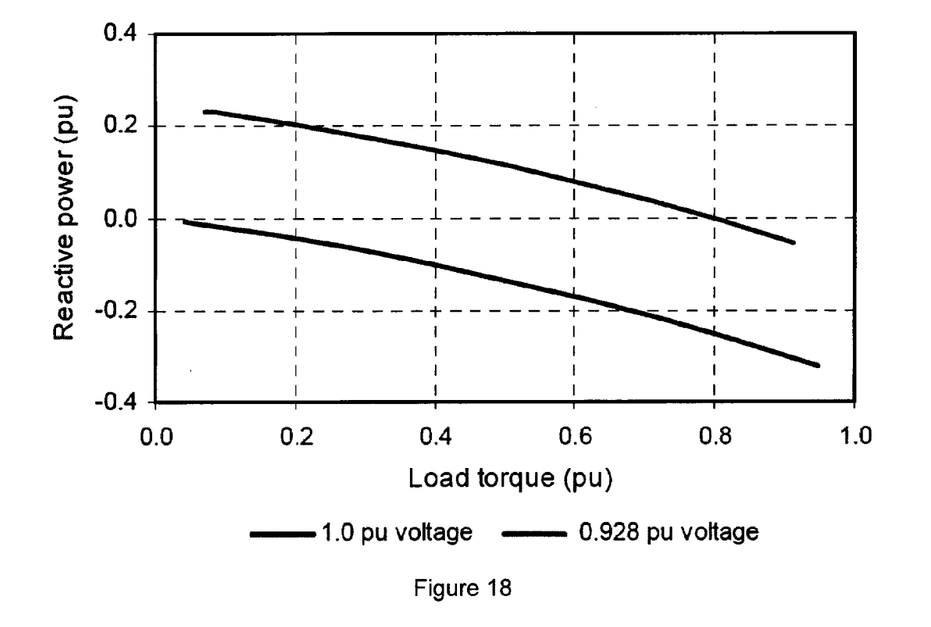
FIG. 18 is a graph showing the variation of the reactive power with load in a machine according to the invention.
Figure 19:
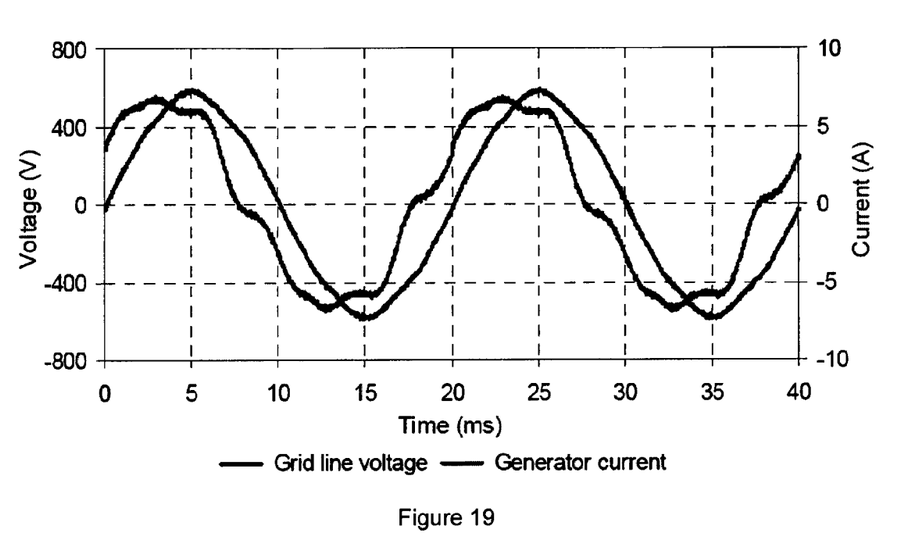
FIG. 19 is a graph showing the leading current of the SG under low grid voltage conditions in a machine according to the invention as measured in the laboratory.

Some of the performance results of the simulations and measurements are shown in FIGS. 15-19. Almost a close to zero percentage cogging torque is obtained as shown in FIG. 14. FIG. 16 shows the torque performance versus slip of the IG and SG short-circuited; the IG develops rated torque at just less than 2% slip and has a pull-out torque of 2.0 per unit. Excellent overall efficiency of higher than 92% is obtained for a wide torque range as shown in FIG. 17. Also, the measured efficiency of the SG compares very well with the calculated results. The variation of the reactive power with load as shown in FIG. 18, with grid voltage a parameter, is very interesting—it implies that the generator can be designed to supply at low loads capacitive reactive power to the grid, but at high loads to draw reactive power, which is exactly how grid voltage compensation is done. Otherwise, if reactive power flow is undesirable, use can be made of tap-changing transformers. FIG. 18 shows the leading current of the SG under low grid voltage conditions measured in the laboratory.

The new proposed split PMIG with non-overlap windings for both the IG and SG is shown to give good results in terms of efficiency over a wide load range. Saturation and cross magnetisation have a significant effect on the dq inductances and the developed torque of the surface mounted PMIG and SG. The relatively high measured cogging torque of 4.5% of the IG is attributed to magnet and manufacturing inequalities. With the non-overlap rotor bar winding the rated torque of the IG is obtained at a fairly low slip frequency of just less than 2%; a pull-out torque of 2.0 per unit is predicted with this type of winding. It is shown that the PMIG compensates automatically for grid voltage variation. For the prototype PMIG the SG comprised about 60% of the total mass of the generator and the IG (with copper rotor bars) about 40% of the mass.

The proposed construction of a 15 kW PMIG overcomes the construction problems experienced in general with PMIGs. This construction is particularly well suited for use with single layer rotor bar windings of the IG. The type of construction can be used for small- and medium-scale wind turbines. The increase in the active mass due to the IG in the specific case is 67%, but the increase of the overall nacelle mass is expected to be much less.

It should be appreciated that, in order to increase the electrical stability of the PMIG system; the PM machine part (the synchronous generator) is directly connected to the network and the IM part (the induction generator) is directly connected to the wind turbine rotor blades. As these machines are magnetically separated, this implies that the IM and the SM machines operate independently from each other as each has its own set of permanent magnets. Power is therefore transferred between the two PM rotors which are mechanically linked.

The slip action, typical to the IM, ensures that the stochastic torque moments induced by the wind turbine rotor blades are smoothed before these moments are transferred to the PM machine rotor. This smoothed power flow enables the direct grid coupling of the PM machine.

The complexities specific to the conventional PMIG mechanical construction are simplified by the invention by implementing a modular, separable machine layout. This implies that the PM machine and IM are constructed separately and are interchangeable. With the design methods used, the IM part is in reality much easier to construct than the normal PM machine. The final assembly is done by mounting the IM machine on the front of the PM machine. This modular approach allows S-PMIG to operate as a full PMIG (PM and IG) or as a conventional PM (no IM) synchronous generator It should be appreciated that the S-PMIG of this invention is therefore a PMIG of modular, separable mechanical construction utilising the electrical specific advantages of both independently magnetised IM and PM electrical machines, hence replacing the need for heavy gearboxes and expensive power converters.

If the split PMIG (S-PMIG) of this invention is compared to the known coupled PMIG (C-PMIG), the following are apparent: (i) the amount of PM material used in the S-PMIG is generally the same as in the C-PMIG; (ii) the yoke-mass of the S-PMIG may be higher, but this will be low in high pole number machines relative to the total mass; (iii) the number of poles and size of the IG and the SG in a S-PMIG can differ, which is advantageous from a design point of view; this is not possible in a C-PMIG; (iv) with a S-PMIG, non-overlap windings can be used in both the SG and IG, which is a huge advantage in terms of reduced cogging and load torque ripple and a lower number of coils; a low cogging torque cannot be overemphasized as it affects the start-up of the PMIG and the stability of the freely rotating PM rotor, specifically at low slip speeds; (v) in a S-PMIG with the IG and SG mounted in tandem as shown in FIGS. 5 and 6, the air gap diameters of both the IG and SG can be put to a maximum to maximise generated torque.

It should also be appreciated that either overlap or non-overlap windings may be used on both the IG and SG but that, in particular, the modular construction of the machine in accordance with the invention makes the use of non-overlap windings possible. While it is anticipated that overlap windings may in some cases provide better results, the use of non-overlap windings have significant cost advantages, which will make the machine more economically viable.

The invention therefore provides a split-PMIG machine which incorporates magnetic separation of the synchronous—and induction generators which implies having two independent electrical machines operating in combination as one generating unit. The mechanical design of the machine of the invention follows a modular, separable approach by having an induction machine mounted on a synchronous machine and being able to separate them again.

To the inventor's knowledge, the proposed invention represents the first low speed high pole PMIG as well as the first PMIG to be tested and implemented within a wind energy conversion system.

By omitting the need for a gearbox or power converter, the overall cost of wind energy conversion systems can be reduced to a large extent. With less active components, the result is a more reliable robust system. Thus in order to utilise the full potential of the PMIG, an easily constructible, cost effective PMIG solution is needed as proposed here.

It should be appreciated that a further advantage of the modular construction of the system according to the invention is that, due to both machines effectively operating independently, any type of configuration may be used for the two independent machines. So, for example, an axial flux IM may be coupled with a radial flux SM. Furthermore, different rotor topologies may also be utilised, for example external rotor housed embedded PMs (i.e. flux concentration).

The above description is by way of example only and numerous changes and modifications may be made to the embodiment described without departing from the scope of the invention. In particular, it is foreseeable that the synchronous—and induction generators may be magnetically split in a number of alternative configurations, for example, in a radial fashion, as opposed to the axial fashion as described above. The system may, for example, include one overlap-winding machine and one non-overlap winding machine or a radial flux machine on the one side and an axial flux machine on the other side. Furthermore the amount of poles on the various machines need not be the same. The cage-rotor and the second PM-rotor part may also be interchanged with the second PM-rotor part fixed to the turbine and the cage fixed to the common "PM-rotor". Essentially any machine configuration may be used for both units as long as they have the same torque and power rating. It is also envisaged that the windings of the second PM machine unit may also be short circuited or connected to an electrical system. With this type of connection variable speed operation may be achieved.

The invention claimed is:

1. An electrical energy conversion system comprising two permanent magnet machines;
    a first of the two permanent magnet machines being a synchronous generator and having a stationary stator which is connectable to an electrical system; and
    a second of the two permanent magnet machines being an induction generator and having a cage rotor which is connectable to a mechanical system;
    wherein the two permanent magnet machines are magnetically separated from one another and have a common rotor that houses permanent magnets, wherein the common rotor is freely rotating thereby spinning concentrically with the stator when in use,
    wherein the common freely rotating permanent magnet rotor is magnetically connected to the stationary stator, and wherein the common freely rotating permanent magnet rotor rotates synchronously with the synchronous generator and the induction generator runs at slip speed with respect to the freely rotating permanent magnet rotor.

2. An electrical energy conversion system as claimed in claim 1 wherein the common freely rotating permanent magnet rotor includes at least first and second rotor portions each rotor portion carrying a series of permanent magnets spaced apart around its periphery.

3. An electrical energy conversion system as claimed in claim 2 wherein the common freely rotating permanent magnet rotor is of modular construction and the rotor portions are removably securable to one another, thereby allowing the permanent magnet machines to be operated in combination when the rotor portions are secured to one another and separately when the rotor portions are detached from one another.

4. An electrical energy conversion system as claimed in claim 2 wherein the series of permanent magnets are mechanically linked so as to rotate together, the series of permanent magnets on the first rotor portion being configured to excite coils on the stationary stator of the synchronous generator and the series of permanent magnets on the second rotor portion being configured to excite coils on the cage rotor of the induction generator.

5. An electrical energy conversion system as claimed in claim 3 wherein the permanent magnet machines are mounted end to end in co-axial alignment about a common shaft when working in combination.

6. An electrical energy conversion system as claimed in claim 3 wherein the first rotor portion is removably securable to the second rotor portion in co-axial alignment.

7. An electrical energy conversion system as claimed in claim 1 which is incorporated in a wind turbine with rotor blades of the wind turbine being secured to the cage rotor of the induction generator.

8. An electrical energy conversion system as claimed in claim 1 which is a direct drive, directly grid connected system.

9. An electrical energy conversion system comprising two rotors and a stator with a first of the two rotors being an induction type cage rotor and a second of the two rotors being a permanent magnet rotor which is freely rotating thereby spinning concentrically with the stator when in use, the freely rotating permanent magnet rotor being magnetically connected to the stationary stator and including two co-axially aligned, magnetically separated rotor portions each rotor portion having a series of permanent magnets spaced apart about its periphery, the rotor portions being positioned to allow the series of magnets on a first rotor portion to excite coils on the stator and the series of magnets on the second rotor portion to excite coils on a induction type cage rotor.

10. A wind turbine incorporating an electrical energy conversion system as claimed in claim 1.

* * * * *